(12) United States Patent
Kyriazis et al.

(10) Patent No.: US 8,730,257 B2
(45) Date of Patent: May 20, 2014

(54) COLOR CORRECTION OF MIRRORED DISPLAYS

(75) Inventors: George Kyriazis, San Jose, CA (US); Ian C. Hendry, San Jose, CA (US); Maciej Maciesowicz, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 13/105,778

(22) Filed: May 11, 2011

(65) Prior Publication Data

US 2012/0019546 A1  Jan. 26, 2012

Related U.S. Application Data

(60) Provisional application No. 61/367,788, filed on Jul. 26, 2010.

(51) Int. Cl.
  *G09G 5/02* (2006.01)
  *G06F 3/048* (2013.01)
  *G09G 5/36* (2006.01)

(52) U.S. Cl.
  USPC ............................ 345/590; 715/781; 345/545

(58) Field of Classification Search
  USPC .......................................................... 345/549
  See application file for complete search history.

(56) References Cited

U.S. PATENT DOCUMENTS

| 7,748,634 | B1 * | 7/2010 | Zehr et al. ..................... 235/492 |
| 2007/0139340 | A1 * | 6/2007 | Lin et al. .......................... 345/98 |
| 2009/0261984 | A1 * | 10/2009 | Sugimoto ................. 340/691.1 |
| 2009/0309808 | A1 * | 12/2009 | Swingler ........................ 345/1.3 |
| 2010/0017744 | A1 * | 1/2010 | Kikuchi et al. ................ 715/781 |
| 2010/0309217 | A1 * | 12/2010 | Greenebaum ................ 345/590 |

* cited by examiner

*Primary Examiner* — David Zarka
*Assistant Examiner* — Andrew J Gill
(74) *Attorney, Agent, or Firm* — Wong, Cabello, Lutsch, Rutherford & Brucculeri, LLP

(57) ABSTRACT

The disclosed embodiments provide a system that drives a first display and a second display mirrored to the first display from a computer system. During operation, the system obtains a framebuffer update for a first framebuffer associated with the first display. Next, the system performs a color-correction operation on the framebuffer update to obtain a color-corrected framebuffer update that enables color output from the second display to substantially match color output from the first display. Finally, the system uses the framebuffer update to drive the first display, and uses the color-corrected framebuffer update to drive the second display.

28 Claims, 4 Drawing Sheets

COLOR CORRECTION OF MIRRORED DISPLAYS

RELATED CASES

This application claims priority to U.S. Provisional Application No. 61/367,788, entitled "Color Correction of Mirrored Displays" by inventors Geroge Kyriazis, Ian C. Hendry and Maciej Maciesowicz, filed 26 Jul. 2010, the contents of which are incorporated herein by reference.

BACKGROUND

1. Field

The present embodiments generally relate to driving displays from a computer system. More specifically, the present embodiments relate to techniques for driving mirrored displays with color correction from a computer system.

2. Related Art

Interactions between a user and a computer system may be facilitated by connecting multiple displays to the computer system. For example, the connection of an external monitor to a laptop computer may allow the user of the laptop computer to simultaneously view more documents, media files (e.g., video, images, etc.), and/or graphical user interfaces (GUIs) for applications than would be possible with just the laptop computer's built-in monitor. Alternatively, multiple displays may be mirrored by a computer system to facilitate the viewing of content from different locations and/or directions. For example, mirrored displays may be used during a presentation to allow presentation slides to be viewed from all seats in a large lecture hall.

To drive mirrored displays, graphical output for the displays may be rendered, color-corrected to one of the displays, and written to a shared framebuffer. Each display may then be updated with data from the framebuffer at the refresh rate of the display. However, displays that differ in brand and/or display technology frequently differ in their associated color spaces. For example, a television may display colors with a bluish tint, while a high-resolution display used for graphic design may display colors with a yellowish tint.

Mirroring of displays with different color spaces may thus produce noticeable differences in the displays' color outputs, as well as the inaccurate generation of colors in at least some of the displays. For example, a blue-tinted television and a yellow-tinted liquid crystal display (LCD) may be connected to the same computer system and mirrored. To color-correct for the television, the pixel values in the shared framebuffer may be shifted toward the yellow end of the visible spectrum. On the other hand, the same pixel values may exacerbate the yellow tint of the LCD.

Hence, what is needed is a mechanism for facilitating the production of correct color output in mirrored displays connected to a computer system.

SUMMARY

The disclosed embodiments provide a system that drives a first display and a second display mirrored to the first display from a computer system. During operation, the system obtains a framebuffer update for a first framebuffer associated with the first display. Next, the system performs a color-correction operation on the framebuffer update to obtain a color-corrected framebuffer update that enables color output from the second display to substantially match color output from the first display. Finally, the system uses the framebuffer update to drive the first display, and uses the color-corrected framebuffer update to drive the second display.

In some embodiments, using the color-corrected framebuffer update to drive the second display involves loading the color-corrected framebuffer update into a second framebuffer associated with the second display.

In some embodiments, the framebuffer update is for a portion of the first framebuffer, and the color-corrected framebuffer update is loaded into a portion of the second framebuffer without modifying the remainder of the second framebuffer.

In some embodiments, the color-correction operation is performed upon detecting the framebuffer update in the first framebuffer.

In some embodiments, detecting the framebuffer update in the first framebuffer involves monitoring a cyclic redundancy check (CRC) associated with the first framebuffer, and generating an interrupt in response to detecting a change in the CRC.

In some embodiments, the framebuffer update is obtained from the first framebuffer or an update buffer associated with the first display.

In some embodiments, the color-correction operation converts pixel values in a first color space for the first display to pixel values in a second color space for the second display.

BRIEF DESCRIPTION OF THE FIGURES

In the figures, like reference numerals refer to the same figure elements.

DETAILED DESCRIPTION

Figure 1:
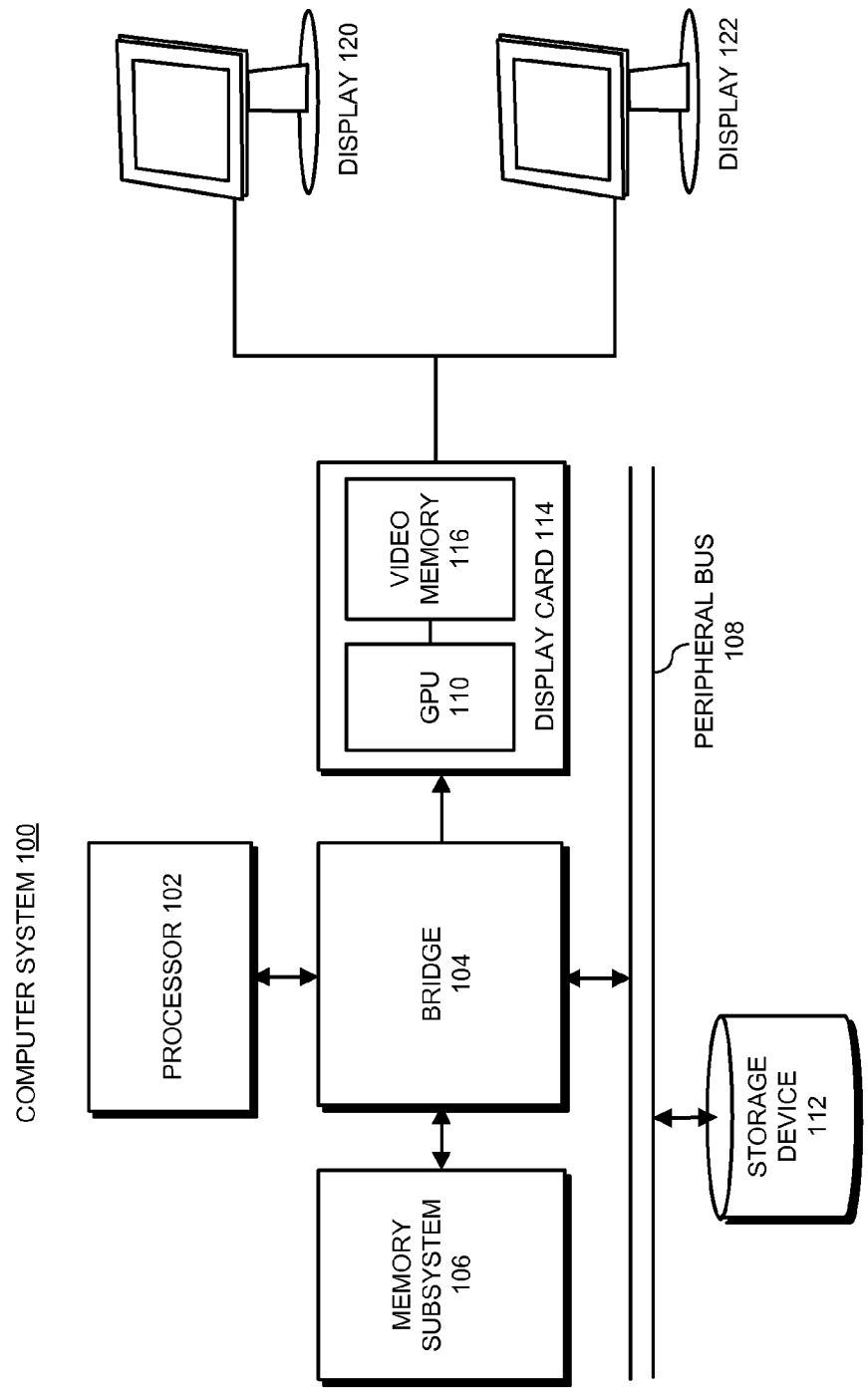
FIG. 1 shows a computer system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for driving multiple displays from a computer system. The computer system may correspond to a laptop computer, personal computer, workstation, and/or portable electronic device. Each display may be a cathode ray tube (CRT) display, liquid crystal display (LCD), plasma display, organic light-emitting diode (OLED) display, surface-conducting electron-emitter display (SED), and/or other type of electronic display.

More specifically, the disclosed embodiments provide color correction of mirrored displays from the computer system. Because each display may be associated with a different color space, the driving of all displays from shared framebuffer data may result in color outputs that differ across the displays. To adjust for such differences in color output, a framebuffer update for a first display may be obtained. The framebuffer update may include pixel values that produce correct color output in the first display.

Next, a color-correction operation may be performed on the framebuffer update to obtain a color-corrected framebuffer update that enables color output from a second display mirrored to the first display to substantially match color output from the first display. The framebuffer update and color-corrected framebuffer update may then be used to drive the first and second displays, respectively. For example, the framebuffer update may be loaded into a first framebuffer associated with the first display, and the color-corrected framebuffer update may be loaded into a second framebuffer associated with the second display.

FIG. 1 shows a computer system 100 in accordance with the disclosed embodiments. Computer system 100 may correspond to a personal computer, laptop computer, portable electronic device, workstation, and/or other electronic device capable of driving multiple displays 120-122. As shown in FIG. 1, computer system 100 includes a processor 102 that is coupled through a bridge chip 104 to a memory subsystem 106 containing semiconductor memory. Processor 102 may also communicate with a storage device 112 containing non-volatile storage through a peripheral bus 108 coupled to bridge chip 104. For example, storage device 112 may be a disk drive containing non-volatile magnetic storage.

In addition, processor 102 may communicate with a number of displays 120-122 using a display card 114. More specifically, processor 102 is coupled to display card 114 through bridge chip 104. Display card 114 includes a graphics-processing unit (GPU) 110 that performs various graphical processing operations to produce video frames in one or more framebuffers located in video memory 116. The video frames may then be used to produce video streams that drive displays 120-122.

Those skilled in the art will appreciate that displays 120-122 may incorporate various types of display technology to render and display images. For example, displays 120-122 may correspond to cathode ray tube (CRT) displays, liquid crystal displays (LCDs), plasma displays, organic light-emitting diode (OLED) displays, surface-conducting electron-emitter displays (SEDs), and/or other types of electronic displays. Furthermore, displays 120-122 may be associated with different manufacturers and/or brands. Such differences in display technology and/or manufacturing may cause displays 120-122 to have different color spaces, which in turn may produce noticeable differences in color output if displays 120-122 are mirrored.

In particular, displays 120-122 may be mirrored to one another by driving both displays 120-122 from a shared framebuffer in video memory 116. Because pixel values in the framebuffer may be color-corrected to only one of the displays, incorrect color output may be produced by driving displays with other color spaces using pixel values in the framebuffer. For example, color-correction for a blue-tinted plasma television may shift pixel values toward the yellow end of the visible spectrum. Conversely, the same pixel values may produce color output that is yellower than normal on a yellow-tinted LCD. As a result, the mirroring of a yellow-tinted LCD to a blue-tinted television in computer system 100 may cause a perceptual difference in the color outputs of the mirrored displays, as well as the incorrect generation of colors in the LCD.

To enable correct color output in mirrored displays with different color spaces, computer system 100 may re-render graphical output with color correction for each mirrored display. For example, a window manager executing on processor 102 and/or GPU 110 may redraw windows, graphical user interfaces (GUIs), and/or other graphical output with color correction for each display connected to computer system 100. The window manager may then output the graphical output to a dedicated framebuffer for the display. However, software-based rendering to multiple displays may be computationally expensive and may negatively impact performance in computer system 100.

In one or more embodiments, computer system 100 includes functionality to provide color correction to all mirrored displays 120-122 without re-rendering graphical output for each display. As discussed below, the color correction may be performed by obtaining a framebuffer update for a first display and performing color correction on the framebuffer update to obtain a color-corrected framebuffer update for a second display mirrored to the first display. The framebuffer update may contain pixel values that are color-corrected to the first display, while the color-corrected framebuffer update may contain pixel values that are color-corrected to the second display. The framebuffer update may then be used to drive the first display, while the color-corrected framebuffer update may be used to drive the second display. Such color correction may enable color output from the second display to substantially match color output from the first display, and may further ensure that colors are produced correctly by both displays.

Figure 2:
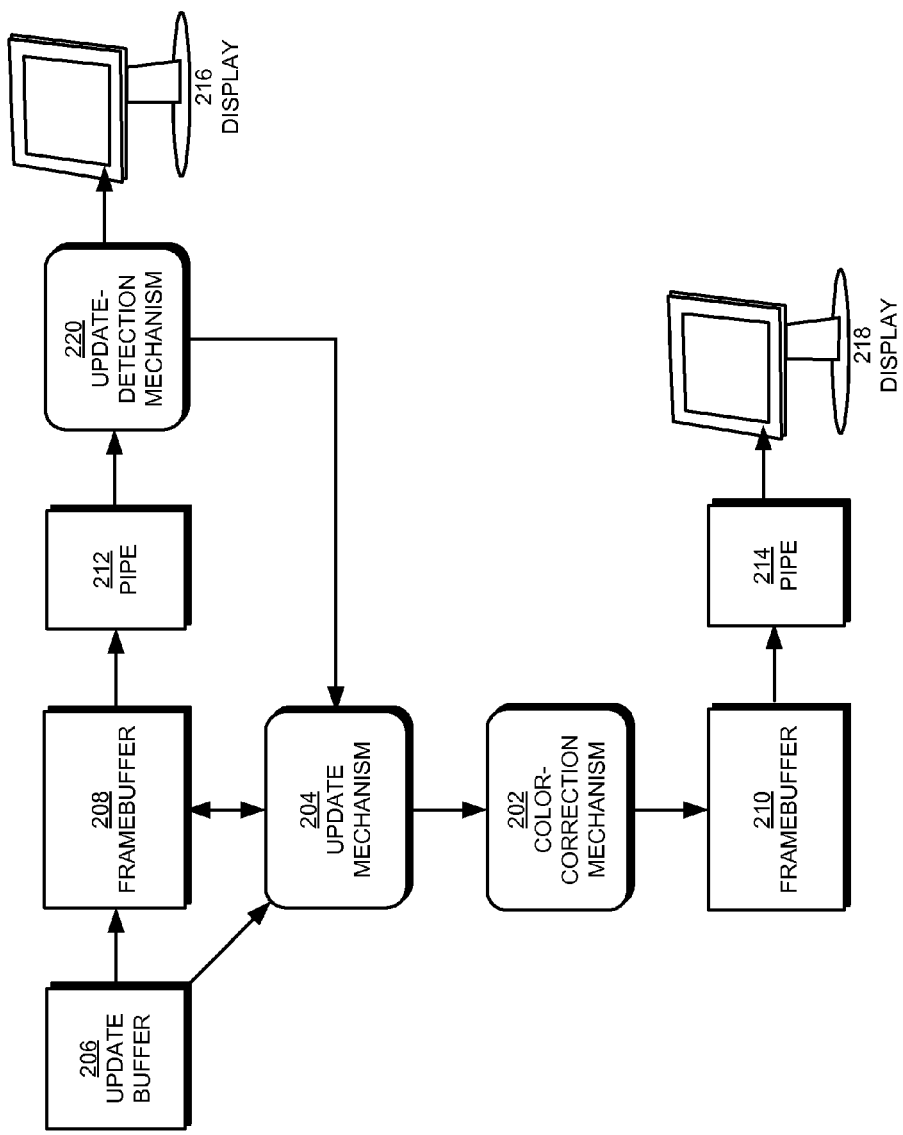
FIG. 2 shows a schematic of a system in accordance with the disclosed embodiments.

FIG. 2 shows a schematic of a system in accordance with the disclosed embodiments. More specifically, FIG. 2 shows a system for driving a first display 216 and a second display 218 mirrored to the first display from a computer system, such as computer system 100 of FIG. 1. As shown in FIG. 2, display 216 is associated with a first framebuffer 208, while display 218 is associated with a second framebuffer 210.

In one or more embodiments, the contents of framebuffers 208-210 are used to drive displays 216-218. In particular, data in framebuffer 208 may be pulled by a pipe 212 at the refresh rate of display 216, while data in framebuffer 210 may be read by a pipe 214 at the refresh rate of display 218. Pipes 212-214 may perform gamma-correction and/or other operations on the pixel values obtained from framebuffers 208-210. Pipes 212-214 may then send the pixel values to displays 216-218 to modify the graphical output of displays 216-218.

Furthermore, changes to the graphical output of displays 216-218 may be provided using an update buffer 206. For example, a window manager in the computer system may render a framebuffer update that is color-corrected to display 216 to update buffer 206. The framebuffer update may contain pixel values that reflect the opening of a new window in the computer system.

An update mechanism 204 may obtain the framebuffer update from update buffer 206 and use the framebuffer update to drive display 216. For example, update mechanism 204 may load the framebuffer update into framebuffer 208 for processing by pipe 212 and outputting by display 216. Alternatively, update mechanism 204 may obtain the framebuffer update from framebuffer 208 after the framebuffer update is loaded into framebuffer 208 using another mechanism, such as a graphics library.

As described above, the system of FIG. 2 may allow displays 216-218 to produce substantially matching and/or correct color output. Because pixel values in update buffer 206 may already be color-corrected to display 216 (e.g., by the window manager), the pixel values may be written to framebuffer 208 and used to produce correct color output in display 216 without additional color correction. However, the same pixel values may result in incorrect and/or noticeably different color output in display 218 if the color space of display 218 is different from the color space of display 216.

To adjust for color space differences between displays 216-218, a color-correction mechanism 202 may perform a color-correction operation on the framebuffer update to obtain a color-corrected framebuffer update that enables color output from display 218 to substantially match color output from display 216. For example, color-correction mechanism 202 may obtain a framebuffer update that is color-corrected for a blue-tinted television and significantly reduce the level of yellow in pixel values within the framebuffer update to obtain a color-corrected framebuffer update that produces correct and/or substantially matching color output in a yellow-tinted CRT monitor. In other words, the color-correction operation may convert pixel values in a first color space for display 216 to pixel values in a second color space for display 218.

Color-correction mechanism 202 may also include functionality to manage differences in the color gamuts of displays 216-218. If the color gamut of display 216 is a subset of the color gamut of display 218, displays 216-218 may output the same colors after color correction. Conversely, if the color gamut of display 218 is a subset of the color gamut of display 216, color-correction mechanism 202 may truncate colors using the color-correction operation, and saturation of some colors may be seen in display 218. Alternatively, to maintain color consistency between displays 216-218, the computer system may be configured to render framebuffer updates that are color-corrected to display 218 and perform color correction on the framebuffer updates to generate color-corrected framebuffer updates that produce substantially the same colors in display 216.

Finally, if the color gamuts of displays 216-218 are both different and not subsets of one another, color-correction mechanism 202 may apply a color-correction operation that produces some color saturation in display 218. On the other hand, framebuffer updates to update buffer 206 may use a color space that is a superset of the color spaces of displays 216-218. To allow colors in displays 216-218 to substantially match, color-correction mechanism 202 may perform two color-correction operations on each framebuffer update so that pixel values in the framebuffer update are mapped to the respective color spaces of displays 216-218.

The color-corrected framebuffer update may then be used to drive display 218. In particular, update mechanism 204 and/or color-correction mechanism 202 may load the color-corrected framebuffer update into framebuffer 210 for processing by pipe 214 and outputting by display 218. Consequently, color-correction mechanism 202 and update mechanism 204 may enable color output in displays 216-218 to substantially match without the computational overhead associated with re-rendering framebuffer updates separately for each display.

The system of FIG. 2 may further reduce computational overhead by applying color correction only after new framebuffer updates are detected, and/or by loading partial framebuffer updates and color-corrected framebuffer updates into framebuffers 208-210 without modifying the remainder of each framebuffer. First, an update-detection mechanism 220 may facilitate the operation of update mechanism 204 and/or color-correction mechanism 202 by detecting new framebuffer updates in the input to display 216. If a new framebuffer update is found, update-detection mechanism 220 generates an interrupt that notifies update mechanism 204 of the new framebuffer update.

Update mechanism 204 may then obtain the framebuffer update from update buffer 206 and/or framebuffer 208 and provide the framebuffer update to color-correction mechanism 202 for the generation of a color-corrected framebuffer update that is used to drive display 218. In other words, update-detection mechanism 220 may allow color correction of new framebuffer updates for use in driving display 218 to occur at the rate at which display 216 is updated with the new framebuffer updates, instead of at the higher refresh rate of display 218. The detection of new framebuffer updates by update-detection mechanism 220 is discussed in further detail below with respect to FIG. 3.

In addition, update-detection mechanism 220 may determine that a new framebuffer update is for a portion of framebuffer 208. For example, the new framebuffer update may only apply to the part(s) of displays 216-218 affected by the closing of a window by the computer system. Instead of reading, color-correcting, and/or writing the entirety of framebuffer 208 into framebuffer 210, update mechanism 204 and/or color-correction mechanism 202 may obtain the portion of framebuffer 208 affected by the framebuffer update from update-detection mechanism 220. Update mechanism 204 and/or color-correction mechanism 202 may then read, color-correct, and/or write the affected portion of framebuffer 208 into framebuffer 210 without modifying the remainder of framebuffer 210.

Figure 3:
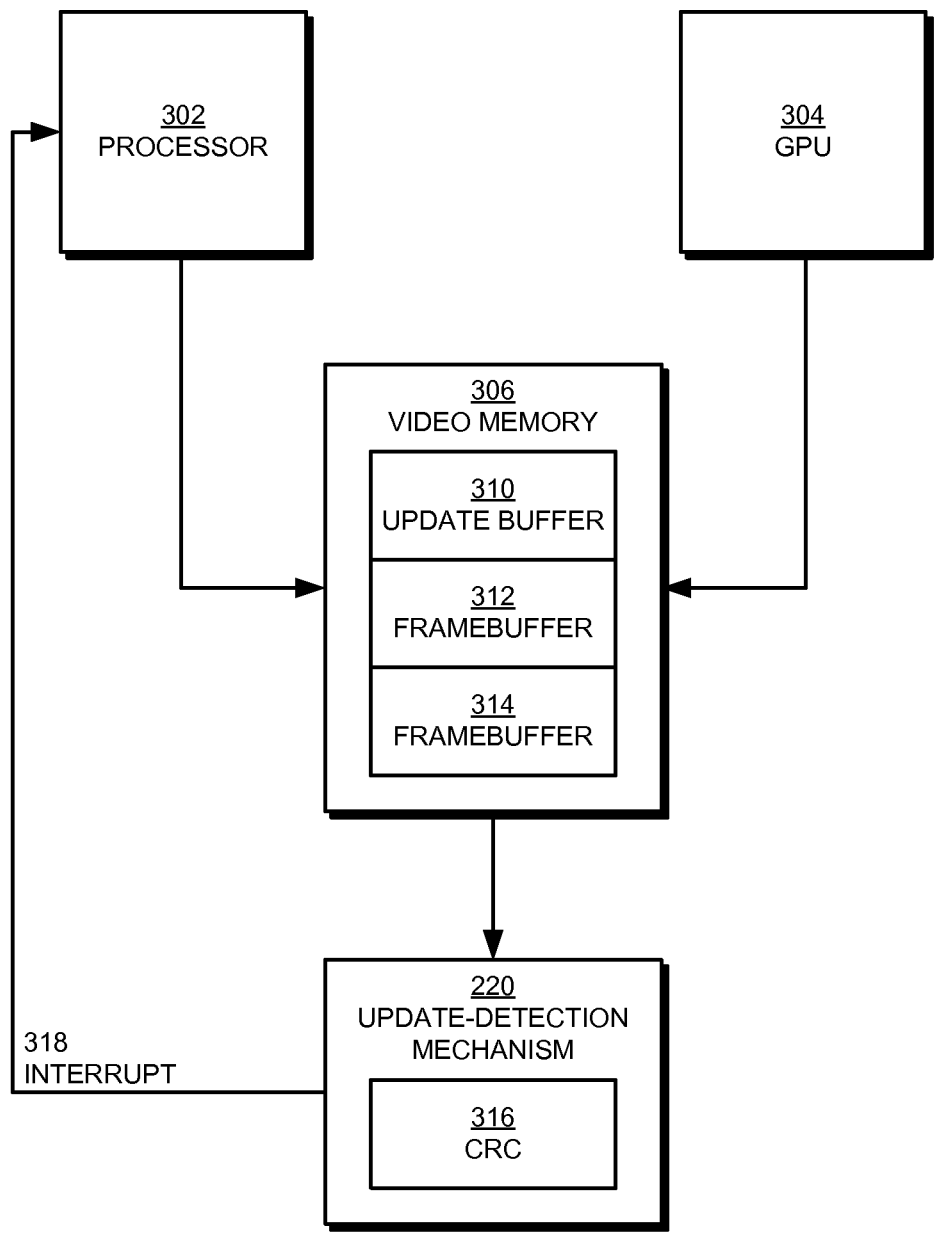
FIG. 3 shows the operation of an update-detection mechanism in accordance with the disclosed embodiments.

FIG. 3 shows the operation of update-detection mechanism 220 in accordance with the disclosed embodiments. As discussed above, update-detection mechanism 220 may be used to detect new framebuffer updates to one or more framebuffers 312-314 in video memory 306. Such framebuffer updates may be written to an update buffer 310 in video memory 306 by a processor 302 and/or GPU 304 and subsequently copied to one or more framebuffers 312-314. For example, update-detection mechanism 220 may be configured to detect the presence of new framebuffer updates in framebuffer 312 that are color-corrected to a first display associated with framebuffer 312.

In one or more embodiments, update-detection mechanism 220 detects new framebuffer updates by monitoring information, such as a cyclic redundancy check (CRC) 316, which is associated with a framebuffer. For example, update-detection mechanism 220 can read the contents framebuffer 312 and can produce a signal that is used to drive the first display based on the contents of framebuffer 312. After every read, update-detection mechanism 220 may compute a new CRC 316 from the contents of framebuffer 312 and compare the new CRC with the previous CRC for framebuffer 312. If a change in CRC 316 is found, update-detection mechanism 220 generates an interrupt 318. Update-detection mechanism 312 can alternatively monitor other types of information to detect frame buffer updates. For example, update-detection mechanism 220 can detect "dirty pages" in a virtual memory (VM) system, or can track changes to the base address of the first framebuffer in a system that supports page-flipping.

Processor 302 and/or GPU 304 may use interrupt 318 to efficiently update one or more other framebuffers. For example, processor 302 and/or GPU 304 may obtain the framebuffer update from update buffer 310 and/or framebuffer 312 and perform a color-correction operation on the framebuffer update to obtain a color-corrected framebuffer update for a second display mirrored to the first display. The second display may have a different color space from the color space of the first display and may be driven from framebuffer 312. Moreover, the color-corrected framebuffer update may allow color output from the second display to substantially match color output from the first display. Processor 302 and/or GPU 304 may then drive the second display by loading the color-corrected framebuffer update into framebuffer 314. In other words, interrupt 318 may allow updates to framebuffer 314 to occur in response to changes in the contents of framebuffer 312 rather than at the refresh rate of the second display.

In addition, interrupt 318 may specify the portion of framebuffer 312 affected by a new framebuffer update. Processor 302 and/or GPU 302 may thus use interrupt 318 to obtain the affected portion of framebuffer 312, perform color correction on the portion, and load the color-corrected portion into framebuffer 314 without modifying the remainder of framebuffer 314 and/or color correcting the remainder of framebuffer 312.

Figure 4:
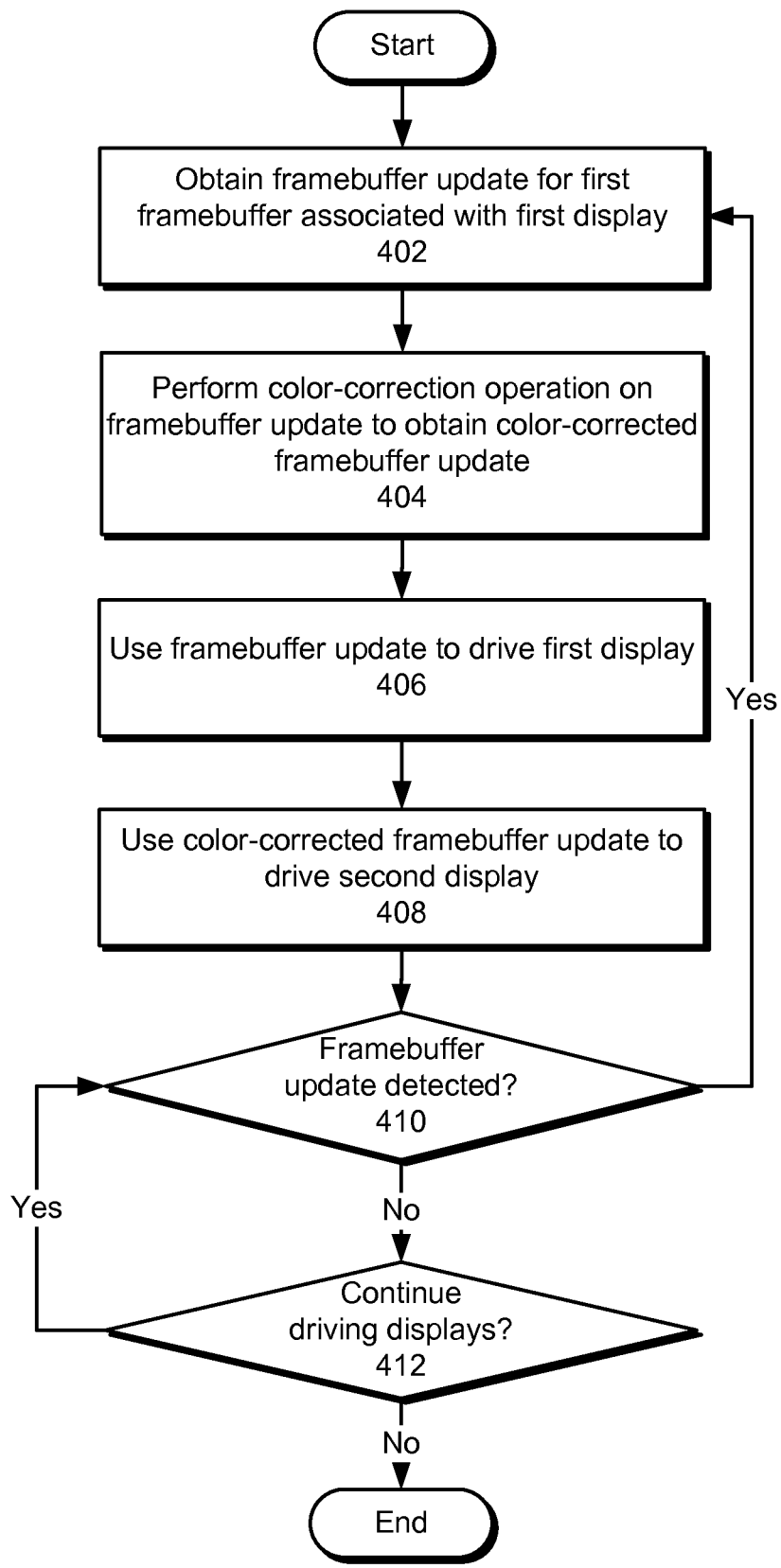
FIG. 4 shows a flowchart illustrating the process of driving a first display and a second display mirrored to the first display in accordance with the disclosed embodiments.

FIG. 4 shows a flowchart illustrating the process of driving a first display and a second display mirrored to the first display in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a framebuffer update for a first framebuffer associated with the first display is obtained (operation 402). The framebuffer update may be obtained from the first framebuffer or an update buffer associated with the first display. Next, a color-correction operation is performed on the framebuffer update to obtain a color-corrected framebuffer update (operation 404). The color-corrected framebuffer update may allow color output from the second display to substantially match color output from the first display. For example, the color-correction operation may adjust for differences in color space and/or gamut between the first and second displays. The framebuffer update is used to drive the first display (operation 406), and the color-corrected framebuffer update is used to drive the second display (operation 408). For example, the framebuffer update and color-corrected framebuffer update may be loaded into the first and second framebuffers, respectively. The first and second displays may then be updated with data from the first and second framebuffers at the displays' respective refresh rates.

A new framebuffer update may also be detected (operation 410). To detect new framebuffer updates, a CRC associated with the first framebuffer may be monitored during reads to the first framebuffer. If a change in the CRC is detected, an interrupt is generated. The interrupt may trigger the generation of a color-corrected framebuffer update (operation 402-404) from the new framebuffer update, as well as the driving of the first and second displays using the new framebuffer update and color-corrected framebuffer update (operations 406-408).

The displays may continue to be driven (operation 412) by detecting new framebuffer updates for the first display (operation 410), obtaining the framebuffer updates (operation 402), generating color-corrected framebuffer updates from the framebuffer updates (operation 404), and using the framebuffer updates and color-corrected framebuffer updates to drive the first and second displays (operations 406-408). For example, the first and second displays may continue to be driven using operations 402-410 until the second display is no longer mirrored to the first display and/or one or both displays are disconnected.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for driving a first display and a second display mirrored to the first display from a computer system, comprising:
    obtaining a framebuffer update for a portion of a first framebuffer associated with a first display, the framebuffer update obtained from the first framebuffer or an update buffer after being processed to create information to cause a graphical update on the first display;
    performing a color-correction operation on the framebuffer update to obtain a color-corrected framebuffer update that is loaded into a portion of the second framebuffer without modifying any remainder of the second framebuffer and that enables color output of the graphical update from a second display to substantially match color output from the first display, the color-corrected framebuffer update obtained without re-rendering the graphical update for the second display;
    using the framebuffer update to drive the first display;
    loading the color-corrected framebuffer update into a second framebuffer associated with the second display; and
    using the color-corrected framebuffer update to drive the second display,
    wherein the framebuffer update and the color-corrected framebuffer update correspond to mirrored output for the first display and the second display.

2. The method of claim 1, wherein the color-correction operation is performed upon detecting the framebuffer update in the first framebuffer.

3. The method of claim 2, wherein detecting the framebuffer update in the first framebuffer involves:
    monitoring information associated with the first framebuffer; and
    generating an interrupt in response to detecting a change in the information.

4. The method of claim 1, wherein the color-correction operation converts pixel values in a first color space for the first display to pixel values in a second color space for the second display.

5. The method of claim 1, wherein graphical output for a plurality of mirrored displays is rendered for less than all of the plurality of mirrored displays.

6. The method of claim 1, wherein the first display has a first refresh rate and the second display has a second refresh rate that is different than the first refresh rate.

7. The method of claim 1, wherein the first display has a first refresh rate and the second display has a second refresh rate that is faster than the first refresh rate, and wherein the color correction operation occurs at the first refresh rate.

8. The method of claim 1, wherein the portion of the first framebuffer comprises the entirety of the first framebuffer.

9. A system for driving a first display and a second display mirrored to the first display, comprising:
a color-correction mechanism configured to:
obtain a framebuffer update for a portion of a first framebuffer from the first framebuffer or an update buffer associated with the first framebuffer after being processed to create information to cause a graphical update on a first display;
perform a color-correction operation on the framebuffer update to produce a color-corrected framebuffer update, corresponding to the portion of the first framebuffer updated by the framebuffer update, in a second framebuffer associated with a second display that enables color output from the second display to substantially match color output from the first display, the color-corrected framebuffer update produced without re-rendering the graphical update for the second display; and
an update mechanism configured to:
use the framebuffer update to drive the first display; and
use the color-corrected framebuffer update to drive the second display,
wherein the framebuffer update and the color-corrected framebuffer update correspond to mirrored output for the first display and the second display.

10. The system of claim 9, further comprising:
an update-detection mechanism configured to facilitate the performance of the color-correction operation by detecting the framebuffer update in the first framebuffer.

11. The system of claim 10, wherein detecting the framebuffer update in the first framebuffer involves:
monitoring information associated with the first framebuffer; and
generating an interrupt in response to detecting a change in the information.

12. The system claim 9, wherein graphical output for a plurality of mirrored displays is rendered for less than all of the plurality of mirrored displays.

13. The system claim 9, wherein the first display has a first refresh rate and the second display has a second refresh rate that is different than the first refresh rate.

14. The system claim 9, wherein the first display has a first refresh rate and the second display has a second refresh rate that is faster than the first refresh rate, and wherein the color correction operation occurs at the first refresh rate.

15. A computer system, comprising:
a first display;
a second display mirrored to the first display;
a first framebuffer associated with the first display;
a second framebuffer associated with the second display;
a color-correction mechanism configured to:
obtain a framebuffer update for a portion of a first framebuffer from the first framebuffer or an update buffer associated with the first framebuffer;
perform a color-correction operation on the framebuffer update after the framebuffer update has been processed to create information to cause a graphical update on the first display; and
obtain, using the color-correction operation, a color-corrected framebuffer update that enables color output from the second display to substantially match color output from the first display, the color-corrected framebuffer update obtained without re-rendering the graphical update for the second display; and
an update mechanism configured to:
use the framebuffer update to drive the first display;
load the color-corrected framebuffer update into a portion of the second framebuffer without modifying any remainder of the second frame buffer; and
use the color-corrected framebuffer update to drive the second display,
wherein the framebuffer update and the color-corrected framebuffer update correspond to mirrored output for the first display and the second display.

16. The computer system of claim 15, further comprising:
an update-detection mechanism configured to facilitate the performance of the color-correction operation by detecting the framebuffer update in the first framebuffer.

17. The system of claim 16, wherein detecting the framebuffer update in the first framebuffer involves:
monitoring information associated with the first framebuffer; and
generating an interrupt in response to detecting a change in the information.

18. The computer system claim 15, wherein graphical output for a plurality of mirrored displays is rendered for less than all of the plurality of mirrored displays.

19. The computer system claim 15, wherein the first display has a first refresh rate and the second display has a second refresh rate that is different than the first refresh rate.

20. The computer system of claim 15, wherein the first display has a first refresh rate and the second display has a second refresh rate that is faster than the first refresh rate, and wherein the color correction operation occurs at the first refresh rate.

21. The computer system of claim 15, wherein the portion of the first framebuffer comprises the entirety of the first framebuffer.

22. A non-transitory computer-readable storage medium storing instructions that when executed by a computer cause the computer to drive a first display and a second display mirrored to the first display, wherein the instructions configure a processor to:
obtain a framebuffer update for a portion of a first framebuffer from the first framebuffer or an update buffer associated with the first framebuffer after the first framebuffer update has been processed to create information to cause a graphical update on a first display, the first framebuffer associated with the first display;
perform a color-correction operation on the framebuffer update to obtain a color-corrected framebuffer update that enables color output from a second display to substantially match color output from the first display, the color-corrected framebuffer obtained without re-rendering the graphical update for the second display;
use the first framebuffer to drive the first display;
load the color-corrected framebuffer update into a second framebuffer associated with the second display; and
use the second framebuffer to drive the second display, wherein the color-corrected framebuffer update is loaded into a portion of the second framebuffer without modifying any remainder of the second framebuffer, and wherein the framebuffer update and the color-corrected framebuffer update correspond to mirrored output for the first display and the second display.

23. The non-transitory computer-readable storage medium of claim 22, wherein the color-correction operation is performed upon detecting the framebuffer update in the first framebuffer.

24. The non-transitory computer-readable storage medium of claim 23, wherein the instructions to cause the computer to detect the framebuffer update in the first framebuffer involves instructions to cause the computer to:

monitor information associated with the first framebuffer; and generate an interrupt in response to detecting a change in the information.

25. The non-transitory computer readable medium of claim 22, wherein graphical output for a plurality of mirrored displays is rendered for less than all of the plurality of mirrored displays.

26. The non-transitory computer readable medium of claim 22, wherein the first display has a first refresh rate and the second display has a second refresh rate that is different than the first refresh rate.

27. The non-transitory computer readable medium of claim 22, wherein the first display has a first refresh rate and the second display has a second refresh rate that is faster than the first refresh rate, and wherein the color correction operation occurs at the first refresh rate.

28. The non-transitory computer-readable storage medium of claim 22, wherein the portion of the first framebuffer comprises the entirety of the first framebuffer.

* * * * *

UNITED STATES PATENT AND TRADEMARK OFFICE
CERTIFICATE OF CORRECTION

| | | |
|---|---|---|
| PATENT NO. | : 8,730,257 B2 | |
| APPLICATION NO. | : 13/105778 | |
| DATED | : May 20, 2014 | |
| INVENTOR(S) | : George Kyriazis et al. | |

It is certified that error appears in the above-identified patent and that said Letters Patent is hereby corrected as shown below:

In the Claims

Column 8, line 40 (Claim 1, line 11), replace "the" with --a--.
Column 8, line 45 (Claim 1, line 16), add --update-- after the word "framebuffer".
Column 8, line 48 (Claim 1, line 19), replace "a" with --the--.
Column 8, line 63 (Claim 3, line 6), add --associated with the first framebuffer-- after the word "information".
Column 9, line 40 (Claim 10, line 2), delete the word "the".
Column 9, line 48 (Claim 11, line 6), add --associated with the first framebuffer-- after the word "information".
Column 9, line 49 (Claim 12, line 1), add --of-- before the word "claim".
Column 9, line 52 (Claim 13, line 1), add --of-- before the word "claim".
Column 9, line 55 (Claim 14, line 1), add --of-- before the word "claim".
Column 9, line 65 (Claim 15, line 7), replace "a first" with --the first--.
Column 10, line 23 (Claim 16, line 2), delete the word "the".
Column 10, line 26 (Claim 17, line 2), add --computer-- before the word "system".
Column 10, line 31 (Claim 17, line 6), add --associated with the first framebuffer-- after the word "information".
Column 10, line 32 (Claim 18, line 1), add --of-- before the word "claim".
Column 10, line 35 (Claim 19, line 1), add --of-- before the word "claim".
Column 10, line 39 (Claim 20, line 1), add --of-- before the word "claim".
Column 10, line 54 (Claim 22, line 8), delete "first" after the word "after".
Column 10, line 62 (Claim 22, line 16), add --update-- after the word "framebuffer".
Column 11, line 13 (Claim 24, line 3), replace "involves" with --involve--.
Column 11, line 18 (Claim 24, line 8), add --associated with the first framebuffer-- after the word "information".
Column 12, line 1 (Claim 25, line 1), replace "computer readable medium" with --computer-readable storage medium--.

Signed and Sealed this
Twelfth Day of August, 2014

Michelle K. Lee
*Deputy Director of the United States Patent and Trademark Office*

CERTIFICATE OF CORRECTION (continued)
U.S. Pat. No. 8,730,257 B2

Column 12, line 5 (Claim 26, line 1), replace "computer readable medium" with --computer-readable storage medium--.
Column 12, line 9 (Claim 27, line 1), replace "computer readable medium" with --computer-readable storage medium--.